United States Patent [19]
Bunker

[11] Patent Number: 5,275,429
[45] Date of Patent: Jan. 4, 1994

[54] CONTROL ARM ASSEMBLY

[76] Inventor: Donald Bunker, 960 Calle Amanecer, San Clemente, Calif. 92672

[21] Appl. No.: 870,485

[22] Filed: Apr. 16, 1992

[51] Int. Cl.⁵ ............................................. B60G 11/58
[52] U.S. Cl. ..................................... 280/688; 280/717
[58] Field of Search ................ 280/688, 713, 717, 725

[56] References Cited

U.S. PATENT DOCUMENTS

| | | | |
|---|---|---|---|
| 3,856,325 | 12/1974 | Willetts | 280/688 |
| 4,575,114 | 3/1986 | Camp | 280/688 |
| 4,840,395 | 6/1989 | Sturmon | 280/688 |

Primary Examiner—David M. Mitchell
Assistant Examiner—Stephen P. Avila
Attorney, Agent, or Firm—Kit M. Stetina

[57] ABSTRACT

This invention relates to an improved control arm assembly for use in the front and/or rear suspension of a vehicle. The control arm assembly is constructed in a manner wherein the bushings incorporated therein may be easily removed and replaced. Such ease of replacement is facilitated by the polyurethane construction of the bushings. When inserted into the suspension, the control arm comprising the control arm assembly is prevented from moving laterally into metal-to-metal contact with a respective frame hanger bracket by the structure of the bushings inserted thereinto.

10 Claims, 2 Drawing Sheets

CONTROL ARM ASSEMBLY

FIELD OF THE INVENTION

The present invention relates generally to automotive components, and more particularly to an improved control arm assembly incorporating replaceable bushings and thrust washers.

BACKGROUND OF THE INVENTION

Incorporated into the front and rear suspensions of numerous automotive vehicles is a component commonly referred to as a control arm. Generally, vehicles which include control arms have an upper and lower control arm assembly which are used in conjunction with the suspension at each axle of the vehicle.

With respect to the front suspension, each of the front control arms are typically mounted adjacent the opposed ends of the front axle. Similarly, with respect to the rear suspension, each of the two rear control arms are typically mounted adjacent the opposed ends of the rear axle. Each of the control arms incorporated into the vehicle suspension extend between pairs of frame hanger brackets, one of which is attached to the vehicle frame with the other being attached to either the front or rear axle. Attached to the center portion of each of the control arms is a suspension spring which extends upwardly therefrom. Additionally, attached to one end of each of the control arms is a shook absorber which also extends upwardly therefrom.

Each control arm typically includes two control arm bushings which are disposed within apertures located adjacent the opposed ends of the control arm. In control arms as currently known and manufactured, each of the two control arm bushings are fabricated from rubber and press-fit into a respective aperture disposed within the control arm through the use of an arbor press or similar device. Each of the control arm bushings is generally sized to protrude slightly outwardly from each end of the aperture into which it is disposed. Thus, when the control arm is disposed within its respective pair of frame hanger brackets, the brackets themselves, which are typically Ushaped, come in contact with only the rubber bushing as opposed to the metal control arm itself. As can be appreciated, over extended periods of time, the rubber bushings disposed within the control arms typically wear and shrink, thereby allowing the control arm to chatter, i.e. move relative the bushing, as well as travel laterally along the length of the bushing. When such occurs, vibration dampening is decreased, and oftentimes the control arm itself comes into contact with one side of the frame hanger bracket thereby causing metal-to-metal contact. Such metal-to-metal contact in turn gives rise to diminished vehicle handling in addition to wear of the suspension components.

With control arm assemblies as currently known, once one or both of the two control arm bushings disposed within the control arm become worn, typically the entire control arm is removed and replaced. This is due to the difficulties commonly associated with attempting to press-fit new control arm bushings into the control arm. As can be appreciated, replacing the entire control arm assembly as opposed to only the control arm bushings themselves gives rise to significantly increased costs in the repair operation. Thus, there exists a need in the art for a control arm assembly wherein the control arm bushings may be easily and quickly replaced without the need for replacing the entire control arm.

SUMMARY OF THE INVENTION

In accordance with the preferred embodiment of the present invention, there is provided an improved vehicle suspension control arm assembly. The control arm assembly generally comprises an elongate control arm which is extendable between a first frame hanger bracket and a second frame hanger bracket. Disposed adjacent the first end of the control arm is a first aperture while disposed adjacent the second end of the control arm is a second aperture. Additionally, disposed about the periphery of each end of both the first and second apertures are outwardly extending rib members. A first sleeve is inserted into and secured within the first aperture while a second sleeve is inserted into and secured within the second aperture.

The control arm assembly further comprises a first bushing which is sized and configured to be slidably receivable into the first sleeve and a second bushing which is sized and configured to be slidably receivable into the second sleeve. The first bushing comprises first and second bushing segments while the second bushing comprises third and fourth bushing segments. In the preferred embodiment, the first and third bushing segments define a proximal end having a first laterally extending flange formed about the periphery thereof and a distal end. The distal ends of the first and third segments of the first and second bushings are slidably receivable into the first and second sleeves, respectively, in a manner wherein the flange formed on each of the proximal ends is abutted against a respective sleeve while each of the distal ends reside within a respective sleeve. Similar to the first and third segments, the second and fourth bushing segments of the first bushing and second bushing each define a proximal end having a second laterally extending flange formed about the periphery thereof and a distal end. The distal ends of the second segment of the first bushing and fourth segment of the second bushing are slidably receivable into the ends of the first and second sleeves, respectively, opposite those into which the first and third segments are inserted. When inserted into their respective sleeves, the distal ends of the second and fourth segments reside therewithin in close proximity to the distal ends of the first and third segments. Additionally, portions of the first and second sleeves are received into annular grooves formed in the inner surfaces of the second flanges. The second and fourth segments further include shoulders formed within the grooves which are sized and configured to receive the rib member disposed in closest proximity thereto when a respective sleeve is received into the groove. In the preferred embodiment, the first and second flanges formed on the proximal ends of the first and second segments of the first bushing are adapted to prevent contact between the control arm and the first frame hanger bracket, while the first and second flanges formed on the proximal ends of the third and fourth segments of the second bushing are adapted to prevent contact between the control arm and the second frame hanger bracket. The first and second segments of the first bushing and third and fourth segments of the second bushing are preferably formed from polyurethane. Additionally, the first and second segments of the first bushing and/or the third and fourth segments of the second bushing may have either circular or elliptical cross-sectional configurations.

It is an object of the present invention to provide a control arm assembly wherein the bushings disposed within the control arm may be easily and quickly replaced.

Another object of the present invention is to provide a control arm assembly including bushing segments adapted to prevent the control arm from coming into metal-to-metal contact with the frame hanger brackets.

A further object of the present invention is to provide an improved bushing for retrofit applications in control arms produced as original equipment on conventional motor vehicles.

A further object of the present invention is to provide an improved bushing adapted for use as a pivot point for other types of conventional suspensions such as leaf springs and heavy-duty trucks.

BRIEF DESCRIPTION OF THE DRAWINGS

These as well as other features of the present invention will become more apparent upon reference to the drawings wherein.

DETAILED DESCRIPTION OF THE PREFERRED EMBODIMENT

Figure 1:
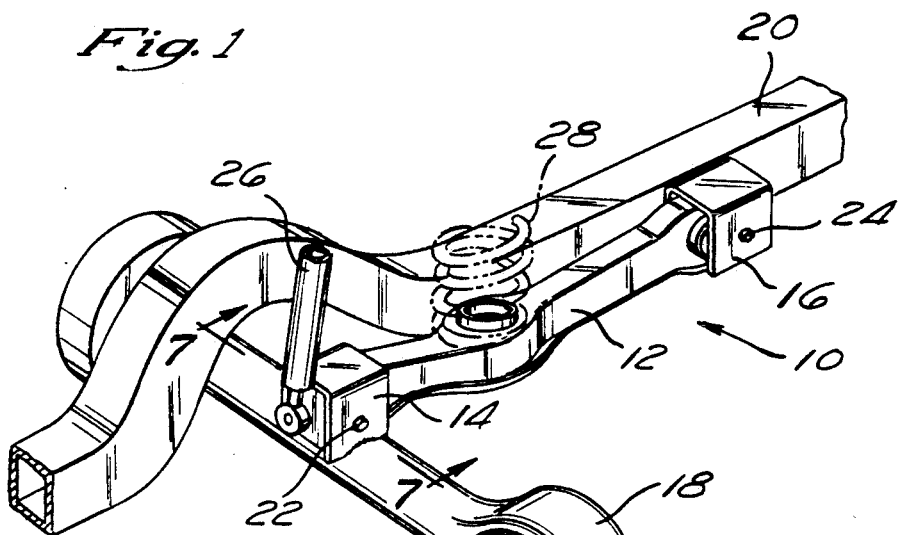
FIG. 1 is a perspective view of the control arm assembly of the present invention as incorporated into the rear suspension of a vehicle.

Referring now to the drawings wherein the showings are for purposes of illustrating a preferred embodiment of the present invention only and not for purposes of limiting the same, FIG. 1 perspectively illustrates the control arm assembly 10 of the present invention as interfaced to the rear suspension of a vehicle. Control arm assembly 10 generally comprises an elongate control arm 12 which extends between a first frame hanger bracket 14 and a second frame hanger bracket 16. Typically, first frame hanger bracket 14 and second frame hanger bracket 16 each have a generally U-shaped configuration. First frame hanger bracket 14 is attached to the rear axle/differential 18 while second frame hanger bracket 16 is attached to the frame 20 of the vehicle. As is conventional, the control arm 12 is retained within first frame hanger bracket 14 by a first pin/bolt 22 and within second frame hanger bracket 16 by a second pin/bolt 24. Additionally, extending upwardly from the end of control arm 12 disposed within first frame hanger bracket 14 is a shock absorber 26, while extending upwardly from the center portion of control arm 12 is a suspension coil spring 28 (shown in phantom). Though control arm assembly 10 is shown as positioned adjacent the left side of the differential 18, it will be appreciated that the control arm assembly adjacent the right side of the differential 18 would have a configuration identical to that as previously described. Additionally, the front suspension, though not shown, would also have a similar configuration, with the control arm assemblies comprising the front suspension being disposed adjacent the opposed ends of the front axle.

Figure 2:
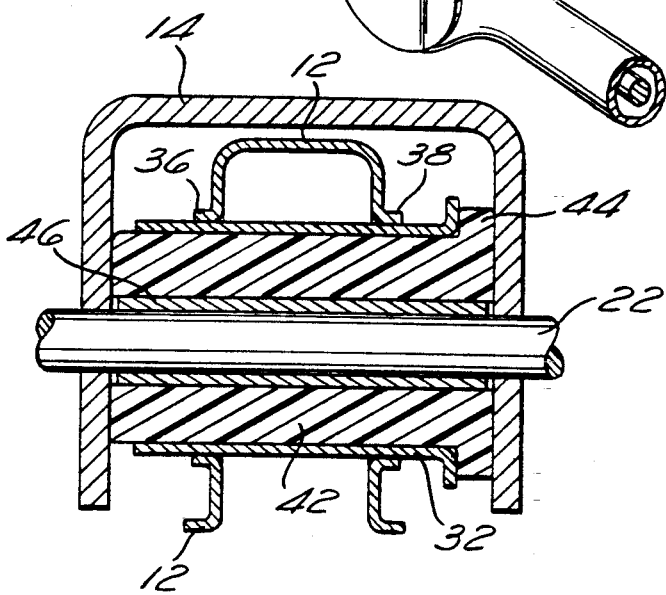
FIG. 2 is a cross-sectional view of a control arm assembly constructed in accordance with the prior art.
Figure 3:
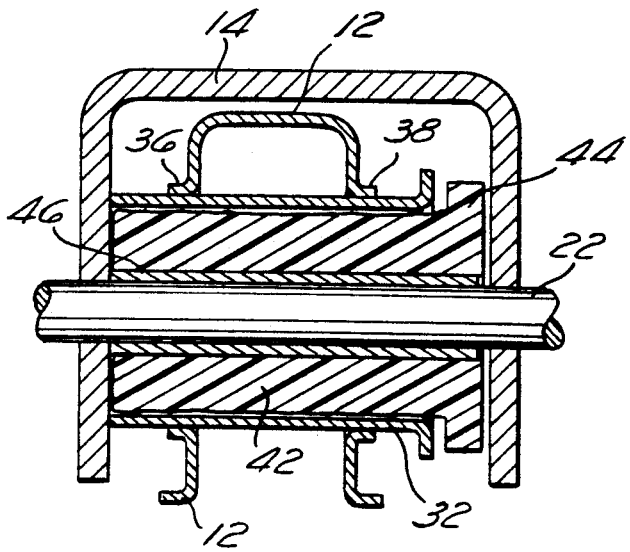
FIG. 3 is a cross-sectional view of a control arm assembly constructed in accordance with the prior art, illustrating a bushing in a worn state.
Figure 4:
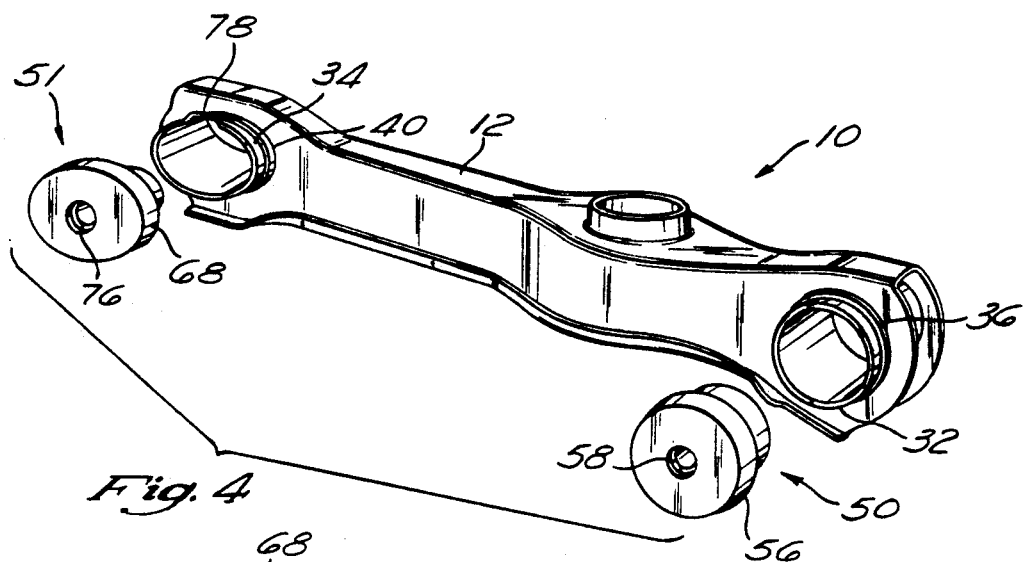
FIG. 4 is an exploded view illustrating the manner in which the second and fourth segments of the first and second bushings of the present invention are interfaced to the control arm.

Referring now to FIGS. 2–4 and 7, common components of both a prior art control arm assembly and the control arm assembly 10 constructed in accordance with the present invention will be described prior to the discussion of the new components and improvements associated with the present invention. The control arm 12 is typically constructed from a single piece of metal formed from a stamping operation. The control arm 12 is formed to include first and second apertures which are disposed adjacent the opposed ends thereof and rib members which are disposed about the periphery of and extend outwardly from each end of each aperture. Sleeves are then positioned within each of the apertures and secured therewithin through a welding operation. Each of the sleeves is sized and configured to receive a control arm bushing. Thus, each control arm assembly includes two control arm bushings which are disposed within each of the sleeves disposed in the apertures adjacent the opposed ends of the control arm. Referring now to FIG. 4, a first sleeve 32 is positioned within the aperture adjacent the end of control arm 12 inserted into first frame hanger bracket 14 and a second sleeve 34 is positioned within the aperture adjacent the end of control arm 12 inserted into second frame hanger bracket 16. As also seen in FIG. 4 and more particularly in FIGS. 2, 3, and 7, formed about the periphery of each end of the aperture into which first sleeve 32 is inserted are rib members 36, 38 while formed about the periphery of the aperture into which second sleeve 34 is inserted is a rib member 40 as well as an additional rib member (not shown) which extends outwardly from the opposite end of the aperture.

Having thus described the common components of both the prior art and the control arm assembly 10 of the present invention, reference is now made to FIGS. 2 and 3, wherein the characteristics and operation of a prior art bushing 42 will now be described. As illustrated in FIGS. 2 and 3, the prior art bushing 42 is shown as being inserted into first sleeve 32. It will be appreciated however that the following discussion is equally applicable to a prior art bushing as inserted into second sleeve 34. Bushing 42 is formed having a flange 44 about the proximal end thereof. Bushing 42 further comprises an insert 46 disposed therein which is adapted to receive first pin 22. Importantly, bushing 42 of the prior art is fabricated from rubber and press-fit into first sleeve 32 through the use of an arbor press or similar device. Bushing 42 is inserted into first sleeve 32 in a manner wherein flange 44 is directly abutted against one end of sleeve 32 while the distal end of bushing 42 protrudes slightly outwardly from first sleeve 32. In this particular orientation, bushing 42 is operable to prevent contact from occurring between first sleeve 32 and first frame hanger bracket 14. Referring now to FIG. 3, over extended periods of time the prior art rubber bushing 42 will typically wear and shrink, thereby allowing first sleeve 32 and hence control member 12 to travel laterally along the length of bushing 42. When such movement occurs, first sleeve 32 comes into direct, metal-to-metal contact with one side of first frame hanger bracket 14, which in turn gives rise to diminished vehi- cle handling in addition to wear of the suspension components.

Figure 5:
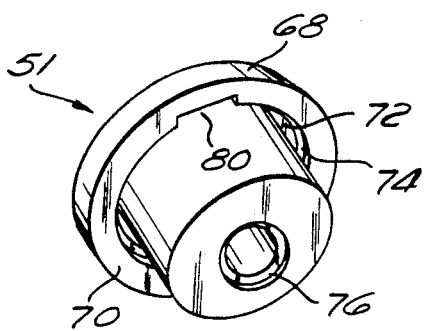
FIGS. 5 and 6 are perspective views of the second and fourth segments of the first and second bushings constructed in accordance with the present invention.
Figure 6:
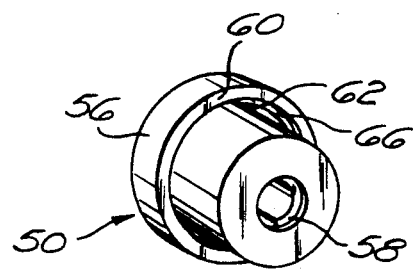
Figure 7:
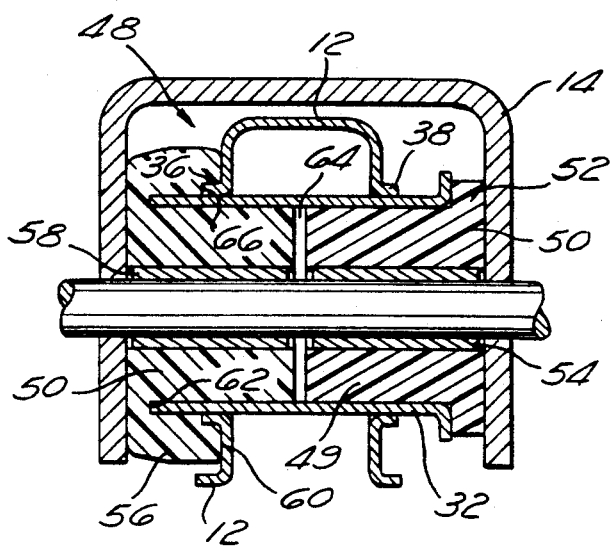
FIG. 7 is a cross-sectional view taken along line 7—7 of FIG. 1, illustrating the interface of the first and second segments of the first bushing to a sleeve of the control arm.

Referring now to FIGS. 4–7, control arm assembly 10 of the present invention includes a first bushing 48 disposed within first sleeve 32 and a second bushing (not fully shown) disposed within second sleeve 34. In the preferred embodiment, first bushing 48 comprises a first bushing segment 49 and a second bushing segment 50, while the second bushing comprises a third bushing segment (not shown) and a fourth bushing segment 51. As seen in FIG. 7, first segment 49 of first bushing 48 includes a first flange 52 formed about the proximal end thereof and a first insert 54 disposed therein which, like insert 46, is sized and configured to receive a portion of first pin 22. First segment 49 is disposed within first sleeve 32 in a manner wherein flange 52 is directly abutted against first sleeve 32 while the distal end of first segment 49 resides within first sleeve 32. Second bushing segment 50 of first bushing 48 includes a second flange 56 formed about the proximal end thereof and a second insert 58 disposed therein which is also sized and configured to receive a portion of first pin 22. Formed within the inner surface 60 of second flange 56 is an annular groove 62 which is sized and configured to receive a portion of sleeve 32 as will be explained below. Second segment 50 is slidably inserted into the end of sleeve 32 opposite the end into which first segment 49 is inserted. When fully inserted into sleeve 32, the distal end of second segment 50 resides therewithin in close proximity to the distal end of first segment 49 and is separated therefrom by only a narrow gap 64. Additionally, the end portion of the sleeve 32 is fully received into the groove 62 within the second flange 56. Formed within and about the interior of groove 62 is an annular shoulder 66 which is sized and configured to receive rib member 36. In this respect, when second segment 50 is fully inserted into sleeve 32, the end portion of the sleeve 32 will reside in groove 62 while the rib member 36 resides within shoulder 66. As will be recognized, when the first and second segments 49, 50 are received into the sleeve 32, the first insert 54 and second insert 58 are oriented in coaxial alignment so as to receive first pin 22.

In the preferred embodiment, first segment 49 and second segment 50 are preferably constructed from polyurethane as opposed to rubber. Additionally, first and second segments 49, 50 are each slidably received into first sleeve 32 as opposed to being press-fit therein. As can be appreciated, though the first and second segments 49, 50 are not press-fit into first sleeve 32, first sleeve 32 is prevented from moving laterally into metal-to-metal contact with frame hanger bracket 14 by the first flange 52 and second flange 56. Though not shown, the third segment of the second bushing is also formed having a flange on the proximal end thereof and is interfaced to second sleeve 34 in the same manner as previously described with respect to first bushing segment 49 and first sleeve 32. As seen in FIG. 5, fourth segment 51 of the second bushing is formed in substantially the same manner as second segment 50 of first bushing 48 and includes a flange 68 formed on the proximal end thereof. Formed in the inner surface 70 of flange 68 is an annular groove 72 which is sized and configured to receive an end portion of second sleeve 34 and includes an annular shoulder 74 formed therein sized and configured to receive rib member 40. As can be appreciated, the fourth segment 51 is inserted into the second sleeve 34 in the same manner previously described with respect to second segment 50 such that the end portion of second sleeve 34 resides within groove 72 while rib member 40 resides within shoulder 74. Disposed within fourth segment 51 is an insert 76 which is adapted to be coaxially aligned with an insert disposed within the third segment when the third and fourth segments are inserted into second sleeve 34. Additionally, the third segment and fourth segment 51 of the second bushing are also preferably fabricated from polyurethane, though other materials may be utilized as an alternative.

As shown in FIGS. 4–6, first bushing 48 and hence first and second segments 49, 50 have generally circular cross-sectional configurations while the second bushing and hence the third segment and fourth segment 51 have generally elliptical cross-sectional configurations. In both the prior art as well as the present control arm assembly 10, one bushing typically has a circular cross-sectional configuration with the other having an elliptical cross-sectional configuration. As such, first bushing 48 and the second bushing have been described having such differing configurations. It will be appreciated however, that first bushing 48 and the second bushing may each have circular or elliptical cross-sectional configurations. With regard to instances when one or both bushings incorporated into control arm assembly 10 have an elliptical cross-sectional configuration, oftentimes the sleeve utilized to receive such an elliptical bushing includes one or more lips formed about the periphery of one end thereof. In this regard, as seen in FIG. 4, second sleeve 34, since being formed to receive an elliptically-shaped bushing, includes an upper lip 78 formed thereon. Accordingly, third segment 51 of the second bushing, which is configured to be utilized in conjunction with elliptical second sleeve 34, includes a notch 80 formed within groove 72 which is adapted to receive upper lip 78.

Additional modifications and improvements of the present invention may also be apparent to those skilled in the art. Thus, the particularly combination of parts described and illustrated herein is intended to represent only one embodiment of the invention and is not intended to serve as limitations of alternative devices within the spirit and scope of the invention.

What is claimed is:

1. An improved vehicle suspension control arm assembly, comprising:

an elongate control arm defining first and second opposed ends, a first aperture extending laterally through said control arm adjacent said first end and a second aperture extending laterally through said control arm adjacent said second end, said control arm being extensible between a pair of frame hanger brackets, each of which comprises opposed side walls disposed in spaced, generally parallel relation;

a first pair of bushing segments slidably insertable into opposed ends of said first aperture;

a second pair of bushing segments slidably insertable into opposed ends of said second aperture;

wherein each of the bushing segments of said first and second pairs defines a distal end slidably insertable into one end of a respective one of said apertures and a proximal end having a laterally extending flange formed about the periphery thereof;

a first annular groove disposed within the flange of one bushing segment of the first pair, said first groove being sized and configured to receive a portion of said control arm when said first pair of bushing segments are inserted into said aperture; and a second annular groove disposed within the flange of one bushing of the second pair, said second groove being sized and configured to receive a portion of said control arm when said second pair of bushing segments are inserted into said second aperture;

the flanges of said bushing segments being abutted against said control arm when the distal end thereof are fully received into said apertures and disposed between the control arm and the opposed side walls of a respective one of said frame hanger brackets in a manner preventing contact therebetween when the control arm is extended between the frame hanger brackets.

2. The control arm assembly of claim 1 wherein said control arm further comprises:

a first tubular sleeve member disposed within said first aperture and defining a first and second end portions protruding outwardly from the opposed ends of said first aperture; and a second tubular sleeve member disposed within said second aperture and defining first and second end portions protruding outwardly from the opposed ends of said second aperture;

said first pair of bushing segments being slidably insertable into opposed ends of said first sleeve member, and said second pair of bushing segments being slidably insertable into opposed ends of said second sleeve member.

3. The control arm assembly of claim 2 wherein the first annular groove is sized and configured to receive the first end portion of the first sleeve member when the first pair of bushing segments are slidably inserted thereinto, and the second annular groove is sized and configured to receive the first end portion of the second sleeve member when the second pair of bushing segments are slidably inserted thereinto.

4. The control arm assembly of claim 3 wherein said control arm further comprises:

a first annular rib member extending about the periphery of one end of said first aperture, the first end portion of said first sleeve member protruding outwardly from said first rib member; and a second annular rib member extending about the periphery of one end of said second aperture, the first end portion of said second sleeve member protruding outwardly from said second rib member.

5. The control arm assembly of claim 4 wherein the first annular groove disposed within the flange portion of one of the bushing segments of the first pair includes a first shoulder formed therein sized and configured to receive said first rib member when the first end portion of said first sleeve member is fully received into said first annular groove, and the second annular groove disposed within the flange of one of the bushing segments of the second pair includes a second shoulder formed therein sized and configured to receive the second rib member when the first end portion of the second tubular member is fully received into the second annular groove.

6. The control arm assembly of claim 1 wherein each of the bushing segments of said first and second pairs includes a tubular insert disposed therein and extending therethrough, the inserts disposed within the bushing segments of the first pair being coaxially aligned when the first pair of bushing segments are slidably inserted into the opposed ends of the first aperture, and the inserts disposed within the bushing segments of the second pair being coaxially aligned when the second pair of bushing segments are slidably inserted into the opposed ends of the second aperture.

7. The control arm assembly of claim 1 wherein each of the bushing segments of the first and second pairs is constructed from polyurethane.

8. The control arm assembly of claim 1 wherein the bushing segments of the first and second pairs each have a generally circular cross-sectional configuration.

9. The control arm assembly of claim 1 wherein the bushing segments of the first and second pairs each have a generally elliptical cross-sectional configuration.

10. The control arm assembly of claim 1 wherein one pair of the bushing segments each have generally circular cross-sectional configurations, with the other pair of bushing segments each having generally elliptical cross-sectional configurations.

* * * * *